US006388565B1

(12) United States Patent
Bernhard et al.

(10) Patent No.: US 6,388,565 B1
(45) Date of Patent: May 14, 2002

(54) GUIDANCE SYSTEM FOR ASSISTING LANE CHANGE OF A MOTOR VEHICLE

(75) Inventors: Werner Bernhard, Filderstadt; Uwe Regensburger, Ostfildern; Carsten Knoeppel, Stuttgart; Gerhard Noecker, Goeppingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/567,058

(22) Filed: May 8, 2000

(30) Foreign Application Priority Data

May 8, 1999 (DE) .......................................... 199 21 449

(51) Int. Cl.$^7$ ................................................ B60Q 1/00
(52) U.S. Cl. ........................ 340/435; 340/436; 340/437; 340/438
(58) Field of Search ................................ 340/435, 436, 340/437, 438, 996

(56) References Cited

U.S. PATENT DOCUMENTS

| 5,343,206 A | * | 8/1994 | Ansaldi et al. | 342/70 |
| 5,521,579 A | * | 5/1996 | Bernhard | 340/438 |
| 5,583,495 A | * | 12/1996 | Ben Lulu | 340/904 |
| 5,585,798 A | * | 12/1996 | Yoshioka | 342/70 |
| 5,617,085 A | * | 4/1997 | Tsutsumi et al. | 340/903 |
| 5,786,772 A | * | 7/1998 | Schofield et al. | 340/903 |
| 5,926,126 A | * | 7/1999 | Engelman | 342/70 |
| 6,047,235 A | * | 4/2000 | Hiyokawa et al. | 701/201 |

FOREIGN PATENT DOCUMENTS

| DE | 43 13 568 C1 | 4/1993 |
| DE | 195 26 452 C1 | 1/1995 |
| DE | 195 07 957 C1 | 3/1995 |
| JP | 10166973 | 6/1998 |

* cited by examiner

Primary Examiner—Jeffrey Hofsass
Assistant Examiner—Son Tang
(74) Attorney, Agent, or Firm—Crowell & Moring LLP

(57) ABSTRACT

A vehicle guidance system for assisting a driving lane change includes an object detection unit for detecting objects in a laterally adjacent rearward side space area of the vehicle. An analysis unit receives signals from the object detection unit and determines whether an object is situated in a dead angle section (blind spot) of the monitored rearward side space, or whether any such object in a section of the monitored rearward side space which is rearward beyond a dead angle section is moving forward at a higher speed than the system vehicle. If so, and if, in addition, it detects at the same time a lane change request pertaining to the corresponding side area, it activates a warning indicating unit for emitting a warning signal. According to the invention, a position detection device is provided which determines path data of the obstacle vehicle and the road geometry data, as well as the position of the system vehicle on the road. When the object detection unit detects an obstacle vehicle which is following in the rearward side space, corresponding to the covered distance recorded by the position detection device and the road geometry, a position assignment of the vehicle which is following is determined relative to the road.

12 Claims, 2 Drawing Sheets

GUIDANCE SYSTEM FOR ASSISTING LANE CHANGE OF A MOTOR VEHICLE

BACKGROUND AND SUMMARY OF THE INVENTION

This application claims the priority of German patent document 199 21 449.2, filed May 8, 1999, the disclosure of which is expressly incorporated by reference herein.

The invention relates to a guidance system for assisting a lane changing of a motor vehicle.

A guidance system of this generic type, for assisting a lane change by a motor vehicle from a current lane to an adjacent target lane, is disclosed, for example, in German Patent Document DE 43 13 568 C1. In this system, the forward space and the rearward space of at least the adjacent target lane are monitored for the desired lane change; the spacing between objects detected there (particularly vehicles), and their speeds are measured; and the safety distances are computed therefrom. When all measured distances are larger than the computed safety distances, the possibility of a lane change is recognized. As the result, the driver is largely freed of monitoring tasks and of estimating distances and speeds of vehicles which are following and which are driving ahead. This guiding assistance system is used preferably for passing and merging into an adjacent lane.

German Patent Document DE 195 26 452 C1 discloses a monitoring device which includes an object detection unit for detecting objects in a rearward side space area, and a warning indicating unit which is activated as a function of signals of the object detection unit which coincide with a detected lane change request for emitting a warning signal. The analysis unit determines whether an object is present in a rearward side space section extending beyond the vehicle in the rear, and moving at a higher speed than the vehicle; if so, it activates the warning display for emitting a warning signal when, in addition, it detects a lane change request pertaining to this side range. Lane change requests are preferably detected by way of the flasher position or the steering angle adjustment.

German Patent Document DE 195 07 957 C1 discloses a vehicle with an optical scanning device for a lateral road range. As an optical scanning device, the vehicle contains several infrared transmitting elements arranged side-by-side, an associated CCD-array, and an analysis unit connected on the output side. The analysis unit is equipped for determining contrast and detecting contours. By means of this system, the road surface is scanned to determine a respective road boundary. The travel time determination and the contrast time determination permit the detection of lateral lane markings and the determination of the respective vehicle distance from such markings.

One disadvantage of this type of vehicle guidance assistance system for a lane change from a current lane to an adjacent target line is that, although the vehicle which is following is recognized by means of rearward side space monitoring, the system is incapable of precisely assigning of such vehicle to a driving lane. Particularly in the case of curvy roads a vehicle that follows in the same lane is detected by the rearward side space monitoring system; this leads to an erroneous detection of the vehicle which is following as a lane change obstacle.

It is therefore an object of the invention to provide a vehicle guidance assistance system of the above-mentioned type which achieves more precise and more reliable support of the driver during a lane change.

This and other objects and advantages are achieved by the lane change assistance system according to the invention, which includes an object detection unit for detecting objects in a laterally adjacent rearward space area of the vehicle. An analysis unit receives signals from the object detection unit and determines whether an object is situated in a dead angle section (blind spot) of the monitored rearward side space, or whether any such object in a section of the monitored rearward side space which is beyond a dead angle section, is moving forward at a higher speed than the system vehicle. If so, and if, in addition, it detects at the same time a lane change request pertaining to the corresponding side area, it activates a warning indicating unit for emitting a warning signal. According to the invention, a position detection device is provided which determines path data of the obstacle vehicle and the road geometry data, as well as the position of the system vehicle on the road. When the object detection unit detects an obstacle vehicle which is following in the rearward side space, corresponding to the covered distance recorded by the position detection device and the road geometry, a position assignment of the vehicle which is following is determined relative to the road.

It is an important advantage of the invention that the guidance system for assisting a lane change can precisely determine whether the obstacle vehicle which is following is situated in the target lane. This is particularly advantageous in the case of a multiple-curve route, because a vehicle which is following and is situated in the same lane as the first vehicle but is detected by the rearward side space monitoring device is correctly classified by the guidance system, and therefore no warning device is activated. In this case, a lane change can take place although the rearward side space monitoring device detects the vehicle which is following.

Other objects, advantages and novel features of the present invention will become apparent from the following detailed description of the invention when considered in conjunction with the accompanying drawings.

DETAILED DESCRIPTION OF THE DRAWINGS

Figure 2:
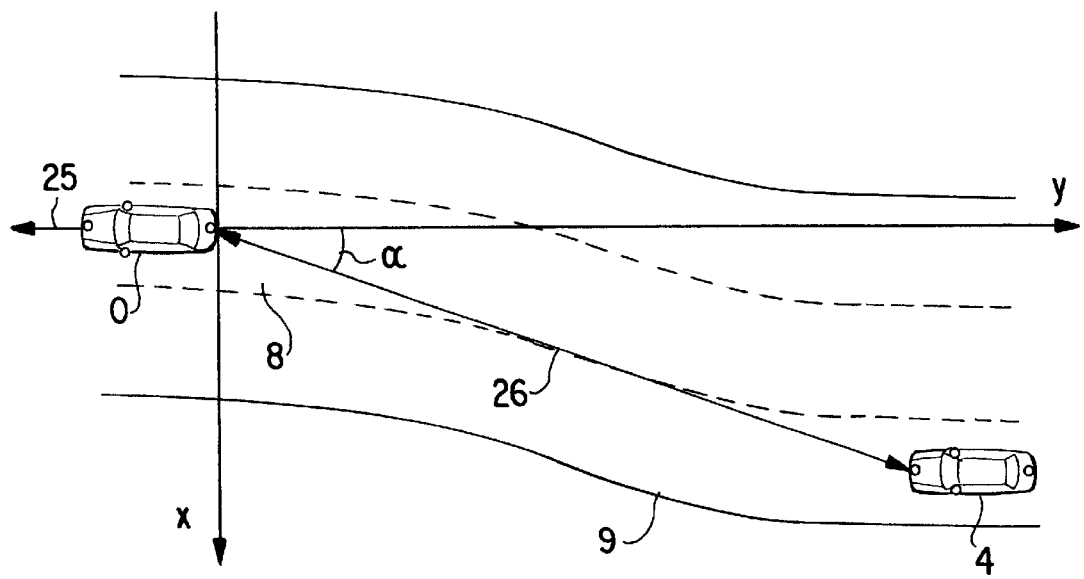
FIG. 2 is a schematic representation of a multiple-curve driving lane with a system vehicle and an obstacle vehicle which is following.

The representation of the road in FIG. 2 shows a vehicle 0 which includes the guidance system according to the invention (the "system vehicle"), in a current driving lane 8, and a vehicle 4 ("obstacle vehicle") which represents a possible obstacle and is following in a target lane 9. (The driving direction, in each case, is indicated by the arrow 25.) The spacing of the two vehicles 0, 4 is indicated by the arrow 26. The driving lane is in an X/Y system of coordinates. The lane detection device has detectors which are preferably arranged on the right and the left side of the vehicle and are directed downward to the ground of the driving lane and thus scan the lane. The detectors of the object detection unit are preferably integrated in the two outside mirrors, the right-hand detector sensing the right rearward side space and the left-hand detector sensing the left rearward side space.

Figure 1:
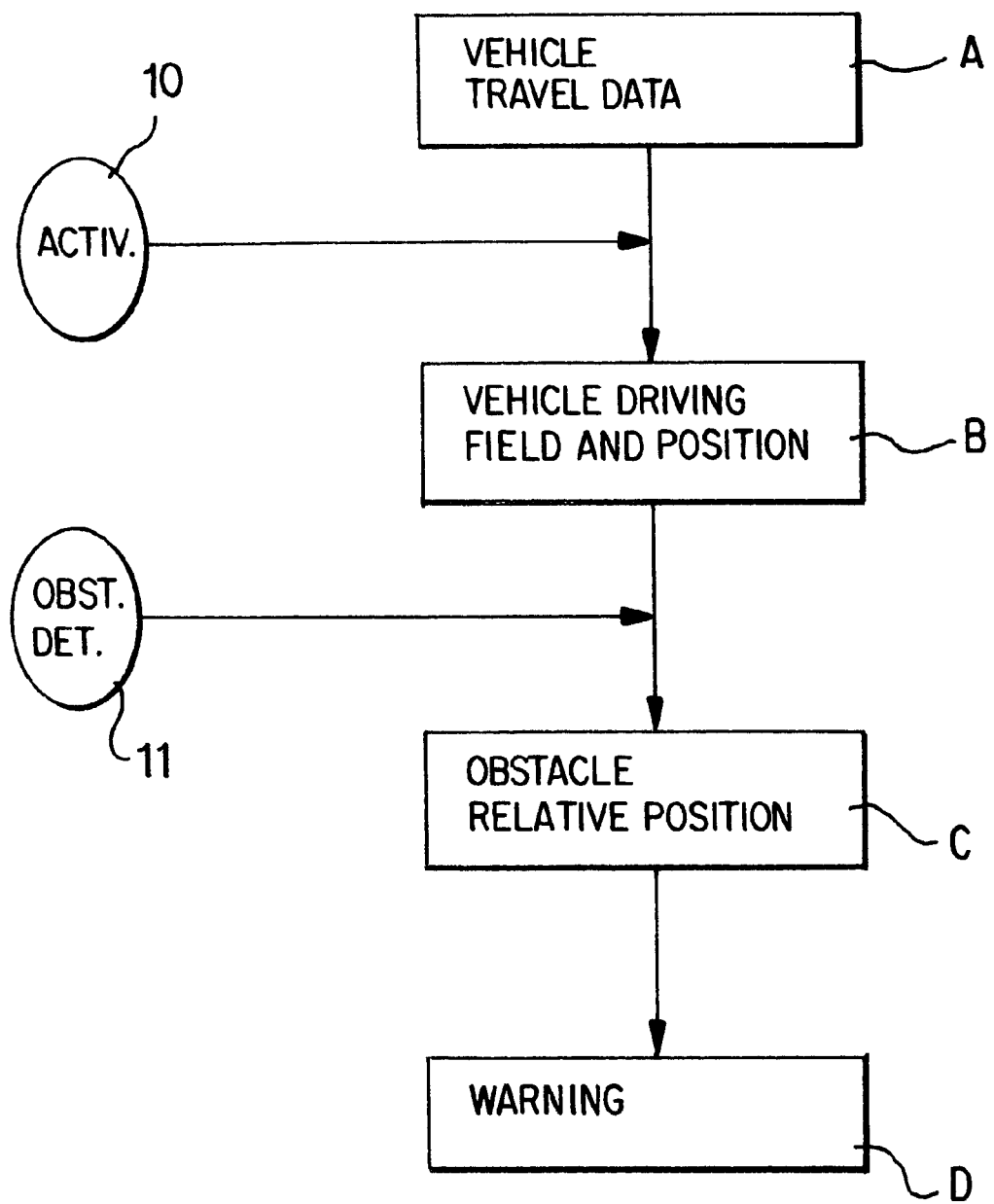
FIG. 1 is a flow chart of a computer-controlled guidance system according to the invention for assisting a lane change.

The method of operation of the computer-aided guidance system for assisting a driving lane change from the current lane 8 to an adjacent target lane 9 (in the illustrated case, a passing lane situated on the left of the current lane 8 in the driving direction) will now be explained in detail with reference to the sequence of FIG. 1.

The guiding assistance is initiated by an activating step 10 which is implemented by an operation of a driving direction indicating lever, which activates the system simultaneously with the triggering of the driving direction indicator. Alternatively, the guidance system can be activated by a mere tipping of the driving direction indicating lever, without actually triggering the driving direction indicator, so that the other traffic participants will not be irritated by the intention of a lane change which may not be implemented at the moment.

First, the traveling distance of the system vehicle is determined in block A. For this purpose, the driving lanes are scanned by means of the lane detection device and the traveled route distance is sensed by a sensing unit, utilizing the cornering radii together with the route. In block B, a determination is then made of the surrounding field of the system vehicle, and by means of driving lane detection, the position of the system vehicle is then determined with respect to the current driving lane and, in the case of a multi-lane road, with respect to other driving lanes. These data can be stored in sections by means of the sensing unit. The object detection device monitors the rearward side space, and a following obstacle vehicle 4 which is situated in the monitored rearward side space is detected. For this purpose, detectors, preferably arranged on both outside mirrors, scan the right and the left rearward space.

In block C, a relative position is determined for the detected object; and based on the present location of the system vehicle 0, the angle a, the distance 26 of the center of gravity of the object 4 and the stored traveling distance of the system vehicle 0 to the object 4, the position of the object (in this case the obstacle vehicle), is also determined relative to the system vehicle 0. Thus, the obstacle vehicle 4 is assigned to a driving lane. When the obstacle vehicle 4 is situated in the target lane 9 at a time when the driver signals a lane change, in D a warning indicating device is activated in the vehicle, indicating to the driver that a lane change is not possible. In the following, these points will be described in detail.

In A, the distance traveled by the system vehicle is determined, for example by way of cornering radii measured by a steering angle sensor and/or an electronic stability program (ESP-signal and/or ABS-signal). At least after each change of one of the signals (cornering radius or route), the amount can be determined in sections (computed in X/Y coordinates) in the longitudinal and transverse direction. By means of these route data, a two-dimensional model is constructed/actualized and stored, for example, in a two-dimensional table.

For example, the X-coordinate may be situated transversely to the driving direction, with the Y-coordinate in the longitudinal direction. After each route section and after each change of the cornering radius, the amount must be newly determined in the longitudinal and the transverse direction. The storage of the distance traveled by the vehicle takes place over the detection range of the detectors of the object detection unit.

The speed-related side slip on a sloped road or during cornering must be compensated by countersteering. As the result, the steering angle sensor generates an apparent larger or smaller cornering radius. By using the signals of the rotational wheel speed sensors instead of the steering angle signal, a more precise detection of the cornering radii can be achieved. The detection of the different route between the interior and the exterior wheels is also conceivable by other methods, such as radar or infrared methods. As an aid, the traveling distance of the system vehicle can also be determined by means of a satellite-assisted system (Global Positioning System). By means of a CD-ROM, the maps of the traveled area, which contain the precise course of the roads, can be read into a navigation system, so that the current position of the system vehicle on the road can be determined in a supporting manner by means of the GPS.

B Determination of the surrounding field of the system vehicle 0: By means of a position detection device, the position of the system vehicle 0 can be determined with respect to the driving lane 8 and to the additional lanes or to the road edge, and the road geometry can be sensed by means of a driving lane detection device. In this case, a differentiation is made between a solid and a broken line. In addition, a turn lane and direction arrows are detected. The road geometry data thus determined are stored and are passed on toward the rear to the detection range of the detectors and are used for determining the course of the road in the rearward space. The detection of the road course in front of the vehicle 0 can also be used to determine the course in the rearward space. For this purpose detectors arranged on the vehicle scan the space in front of the vehicle.

The obstacle vehicle 4 which is following, is detected in 11 by the object detection device. The relative position of the detected obstacle vehicle 4 is sensed in C: The relative speed and the distance 26 of the obstacle vehicle 4 which is detected by the object detection unit is determined by the analysis unit. The direction of the vehicle 4 and, therefrom, the angle with respect to the system vehicle is determined by way of radar sensors or infrared sensors. Alternatively, or in addition, direct detection of the vehicle 4 can be achieved by means of optical sensors and image processing, the angle α and the distance 26, or the spacing in the longitudinal and transverse direction can be determined as the x/y-value. The position of the obstacle vehicle 4 relative to the road is determined, based on the present location of the system vehicle 0, the angle α, the spacing of the center of gravity of the obstacle vehicle 4 and the stored road course of the system vehicle 0 with respect to the obstacle vehicle 4. For this purpose, the angle α and the distance 26 of the vehicle 4 are converted to the system of coordinates of the distance traveled. The value X of the obstacle vehicle 4 at the distance Y is to be compared with the value X of the path at the same distance Y. This comparison supplies the information concerning the path assignment of the system vehicle. In the case of identical X-values, the obstacle vehicle 4 is situated in the current lane 8, the same lane 8 as the vehicle 0 itself. However, if the X-value of the vehicle 4 is offset by a road width toward the left or right, this vehicle 4 is assigned to the corresponding adjacent lane 9.

In D, in the event of danger, that is, when the distance 26 is smaller than a given safety distance, the emission of a warning signal is enabled, and is switched active by the premature detection of a lane change, for example, by the detection of the surroundings and/or the setting of a turn signal when the obstacle vehicle 4 is present in the target lane 9. The warning indication is preferably integrated in the mirror glass of the outside mirror. As a warning signal, for example, a red triangle can flash in the outside mirror. Other warning signals, such as an acoustic signal sound are also conceivable.

Figure 3:
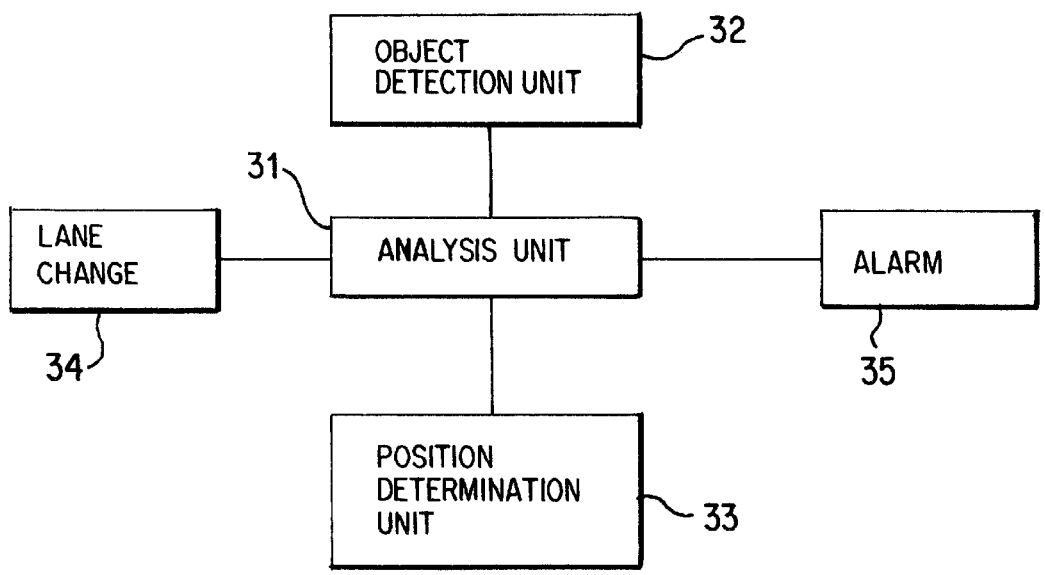
FIG. 3 is a schematic block diagram which shows an embodiment of the guidance system according to the invention.

FIG. 3 is a conceptual block diagram which illustrates an embodiment of the system according to the invention. It consists of an analysis unit 31 which receives detection signals generated by the object detection unit 32 and analyzes them to determine whether an object is situated in a dead angle section of the monitored rearwardly extending area adjacent the vehicle, or in an area which is farther rearward than the dead angle section of the monitored area and is traveling at a rate of speed greater than that of the vehicle. In addition, a position determination unit 33 determines the path followed by the vehicle, as well as road geometry for a road on which the vehicle is traveling, based on information provided by the object detection unit, and information determined by the analysis unit, to determine the position of the system vehicle on the road. In addition, when the object detection unit detects an object which is following in the rearward side area, the position determination unit determines the position of the object relative to the road. In particular, in the manner described previously, the position determination unit determines whether the detected object is situated in a lane adjacent the vehicle. If so, and if at the same time the analysis unit receives a lane change signal from the lane change unit 34, indicating an intention of the operator of the vehicle to change lanes into a target lane in which the object is present, the analysis unit causes the activation of an alarm 35, warning the driver of the vehicle that such lane change cannot safely be made.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A guidance system for assisting a driving lane change of a vehicle, comprising:
   an object detection unit for detecting objects in a monitored area which is rearward and laterally adjacent of the vehicle;
   a warning indicating unit;
   an analysis unit which determines by means of signals supplied to it by the object detection unit whether an object is situated in a dead angle section of the monitored rearward area, and whether an object in a section of the monitored rearward side space which is rearwardly beyond the dead angle section is moving forward at a higher speed than the vehicle, and activates the warning indicating unit for emitting a warning signal if, in addition, it detects a lane change request pertaining to the corresponding side area; wherein
   a position detection device determines path data for the vehicle and road geometry data for a road on which the vehicle travels, as well as a position of the vehicle on the road;
   an analysis unit stores said path data, road geometry, and position of the vehicle; and
   when the object detection unit detects an object which is following in the rearward side space, corresponding to a road distance traveled by the vehicle, for which the position detection device has determined path data and road geometry that are stored by said analysis unit, a position assignment of the object relative to the road is determined by the analysis unit relative to the road, based on the stored path data and road geometry.

2. The guidance system for assisting a lane change according to claim 1, wherein the warning indicating unit is activated for the emission of a warning signal when the object which is following is situated in a target lane of the vehicle for which a lane change request has been made.

3. The guidance system for assisting a lane change according to claim 1, wherein the warning signal comprises the flashing of a red warning triangle in a side mirror of the vehicle.

4. The guidance system for assisting a lane change according to claim 1, wherein the path and road geometry data are stored over a detection range of the object detection unit.

5. The guidance system for assisting a lane change according to claim 1, wherein the road geometry data are detected by means of optical sensors.

6. The guidance system for assisting a lane change according to claim 1, wherein the path data are determined from at least one of a path/speed signal, a steering angle, rotational wheel speed sensors and a satellite-assisted position determination by means of the GPS.

7. The guidance system for assisting a lane change according to claim 1, wherein:
   the guidance assistance system is activated only by the request for a driving direction indication; and
   a requested driving direction indication takes place only when a possible lane change is signaled.

8. The guidance system for assisting a lane change according to claim 1, wherein a detected object which follows is assigned to a corresponding adjacent lane when such object is offset to the left or right of the vehicle by a road width.

9. The method for assisting a driving lane change by an operator of a vehicle, comprising:
   monitoring an area which is rearward and laterally adjacent of the vehicle by means of sensors to detect presence of an object within the monitored area, as well as distance and angular position of said object relative to the vehicle;
   determining a position of the vehicle on a road traveled by the vehicle;
   detecting vehicle navigational operating parameters for said vehicle;
   determining road geometry of the road traveled by the vehicle based on said vehicle operating parameters;
   determining a position of said object relative to the vehicle;
   determining a position of said object relative to the road based on said road geometry, position of said vehicle on the road and position of said object relative to the vehicle; and
   activating an alarm which said operator signals a lane change to a target lane at a time when an object is present in said target lane in said monitored area.

10. The method for assisting a driving lane change by an operator of a vehicle according to claim 9, wherein said sensors detect presence of an object in a dead angle section of said monitored area, as well as an object which is in said monitored area rearward of the dead angle section and moving at a speed greater than a speed of the vehicle.

11. The method for assisting a driving lane change by an operator of a vehicle according to claim 9, wherein said object is a second vehicle.

12. A method for determining a lane position of an object which follows a vehicle, relative to a segment of roadway traversed by the vehicle, said method comprising:

detecting motion parameters of said vehicle as it traverses a segment of roadway comprising a plurality of lanes;

detecting position of the vehicle relative to said traversed segment of roadway;

determining road geometry of said traversed segment of roadway based on said motion parameters and said position of the vehicle detected as said vehicle traverses said segment of roadway;

detecting position, relative to said vehicle, of said object which follows said vehicle; and determining a lane position of said object relative to said traversed segment of roadway based on said road geometry, and said detected position of said object relative to said vehicle.

* * * * *